United States Patent
Murao

(10) Patent No.: US 10,489,889 B2
(45) Date of Patent: Nov. 26, 2019

(54) CONTROL APPARATUS AND CONTROL SYSTEM FOR PERFORMING PROCESS BASED ON CAPTURED IMAGE

(71) Applicant: DENSO CORPORATION, Kariya, Aichi-pref. (JP)

(72) Inventor: Toshikazu Murao, Obu (JP)

(73) Assignee: DENSO CORPORATION, Kariya, Aichi-pref., (JP)

( * ) Notice: Subject to any disclaimer, the term of this patent is extended or adjusted under 35 U.S.C. 154(b) by 371 days.

(21) Appl. No.: 14/674,254

(22) Filed: Mar. 31, 2015

(65) Prior Publication Data

US 2015/0279004 A1 Oct. 1, 2015

(30) Foreign Application Priority Data

Apr. 1, 2014 (JP) .................................. 2014-075503

(51) Int. Cl.
| | |
|---|---|
| *G06T 5/00* | (2006.01) |
| *B60R 1/00* | (2006.01) |
| *H04N 7/18* | (2006.01) |
| *G06T 7/00* | (2017.01) |

(Continued)

(52) U.S. Cl.
CPC ............... *G06T 5/001* (2013.01); *B60R 1/00* (2013.01); *G06T 7/0002* (2013.01); *H04N 7/183* (2013.01); *B60W 30/00* (2013.01); *G06T 2207/30168* (2013.01); *G06T 2207/30252* (2013.01); *G08G 1/16* (2013.01)

(58) Field of Classification Search
CPC .............................. H04N 7/183; G06T 5/001
See application file for complete search history.

(56) References Cited

U.S. PATENT DOCUMENTS

| | | | |
|---|---|---|---|
| 2005/0083432 A1 | 4/2005 | Honda et al. | |
| 2007/0169987 A1* | 7/2007 | Fujiyama | B62D 5/0463 180/446 |

(Continued)

FOREIGN PATENT DOCUMENTS

| | | |
|---|---|---|
| CN | 100525403 C | 8/2009 |
| JP | H04-276839 A | 10/1992 |

(Continued)

*Primary Examiner* — William C Vaughn, Jr.
*Assistant Examiner* — Jerry T Jean Baptiste
(74) *Attorney, Agent, or Firm* — Harness, Dickey & Pierce, P.L.C.

(57) ABSTRACT

A control apparatus acquires a captured image from a camera including an imaging unit, including an image sensor, that generates the captured image. A control unit is provided in the control apparatus and executes, using a processor, a process based on the captured image. The control apparatus receives input of an abnormality signal indicating an abnormality in the imaging unit detected by the camera. When the input of the abnormality signal is received, the control unit performs a process to handle the abnormality in the imaging unit indicated by the abnormality signal. The abnormality indicated by the abnormality signal is an error that has occurred in setting values stored in a storage means provided in the camera. The setting values are used for signal processing including a pixel defect correction and a noise removal process performed with respect to pixel values of the captured image.

1 Claim, 3 Drawing Sheets

(51) Int. Cl.
 *B60W 30/00* (2006.01)
 *G08G 1/16* (2006.01)

(56) References Cited

U.S. PATENT DOCUMENTS

| | | | |
|---|---|---|---|
| 2007/0285526 A1* | 12/2007 | Mann | H04N 5/23245 348/222.1 |
| 2009/0060377 A1* | 3/2009 | Chen | G06T 5/008 382/270 |
| 2009/0066793 A1 | 3/2009 | Takeda | |
| 2009/0251574 A1 | 10/2009 | Yamagata et al. | |
| 2009/0316020 A1* | 12/2009 | Ezawa | G06T 7/0004 348/226.1 |
| 2010/0134631 A1* | 6/2010 | Voth | G01N 15/1459 348/169 |
| 2011/0317049 A1* | 12/2011 | Kurane | H04N 5/23203 348/294 |
| 2012/0007994 A1 | 1/2012 | Yamagata et al. | |
| 2015/0085140 A1 | 3/2015 | Shimizu | |

FOREIGN PATENT DOCUMENTS

| | | |
|---|---|---|
| JP | H09-113221 A | 5/1997 |
| JP | 2001-326951 A | 11/2001 |
| JP | 2005-033680 | 2/2005 |
| JP | 2005-143083 A | 6/2005 |
| JP | 2007-174556 A | 7/2007 |
| JP | 2008-271075 A | 11/2008 |
| JP | 2011-137916 | 7/2011 |
| JP | 2012-010026 A | 1/2012 |
| WO | WO-2013/146744 A1 | 10/2013 |

\* cited by examiner

CONTROL APPARATUS AND CONTROL SYSTEM FOR PERFORMING PROCESS BASED ON CAPTURED IMAGE

CROSS-REFERENCE TO RELATED APPLICATION

This application is based on and claims the benefit of priority from Japanese Patent Application No. 2014-075503, filed Apr. 1, 2014, the disclosure of which is incorporated herein in its entirety by reference.

BACKGROUND

Technical Field

The present disclosure relates to a control apparatus and a control system that performs processes based on captured images.

Related Art

In recent years, an on-board system has become known that performs driving assistance based on images of the periphery of an own vehicle captured by a camera. However, when garbled data (data corruption) occurs in a read-only memory (ROM) or a random access memory (RAM) disposed in the camera such as this, an abnormal captured image is generated. As a result, driving assistance and the like may not be appropriately performed.

In this regard, JP-A-2005-33680 describes that an abnormality in a camera is detected by the luminance of a vehicle body portion of an own vehicle in an image of the periphery of the own vehicle captured by the camera being compared to vehicle-exterior illuminance detected by a sunlight sensor or the like.

However, even when the above-described method is used, abnormality may not be detected depending on the colors in the image captured by the camera in which garbled data has occurred. In such cases, driving assistance and the like may not be appropriately performed.

SUMMARY

It is thus desired to provide a control apparatus and a control system that is capable of appropriately handling an abnormality in a camera.

A first exemplary embodiment provides a control apparatus that includes: acquiring means, executing means, receiving means, and abnormality responding means. The acquiring means acquires a captured image from a camera including an imaging unit that generates the captured image. The executing means executes a process based on the captured image acquired by the acquiring means. The receiving means receives input of an abnormality signal indicating an abnormality in the imaging unit detected by the camera. The abnormality responding means performs a process to handle the abnormality in the imaging unit indicated by the abnormality signal, when the receiving means receives the input of the abnormality signal.

In a configuration such as this, the camera detects the abnormality in the imaging unit. Therefore, the abnormality in the imaging unit can be accurately detected. In addition, when the abnormality signal indicating an abnormality in the imaging unit is inputted, the control apparatus performs a process for handling the abnormality. Therefore, the abnormality in the camera can be appropriately handled.

The imaging unit may include is storage means that stores therein data used for processes related to generation of the captured image. The abnormality indicated by the abnormality signal may be an error that has occurred in the data stored in the storage means.

In a configuration such as this, the control apparatus can detect that garbled data has occurred in the storage means of the camera. An abnormality such as this can be appropriately handled.

In addition, the control apparatus may be mounted in a vehicle.

In a configuration such as this, when garbled data occurs in the storage means of the camera, the control apparatus can be prevented from performing inappropriate driving assistance, vehicle control, and the like.

A second exemplary embodiment provides a control system that includes: a camera that is provided with an imaging unit that generates a captured image; and a control apparatus that performs a process based on the captured image. The camera includes: detecting means that detects an abnormality in the imaging unit; and output means that outputs, to the control apparatus, an abnormality signal indicating that an abnormality in the imaging unit has been detected by the detecting means. The control apparatus includes: acquiring means that acquires the captured image from the camera; executing means that executes a process based on the captured image acquired by the acquiring means; receiving means that receives input of an abnormality signal from the camera; and abnormality responding means that performs a process to handle the abnormality in the imaging unit indicated by the abnormality signal, when the receiving means receives the input of the abnormality signal.

In a configuration such as this, the camera detects the abnormality in the imaging unit. Therefore, the abnormality in the imaging unit can be accurately detected. In addition, when the abnormality signal indicating an abnormality in the imaging unit is inputted, the control apparatus performs a process for handling the abnormality. Therefore, the abnormality in the camera can be appropriately handled.

DESCRIPTION OF EMBODIMENTS

An embodiment of the present disclosure will hereinafter be described with reference to the drawings. The embodiment of the present invention is not limited in any way to the embodiment described below. Various embodiments are possible within the technical scope of the present disclosure.

(Configuration)

Figure 1:
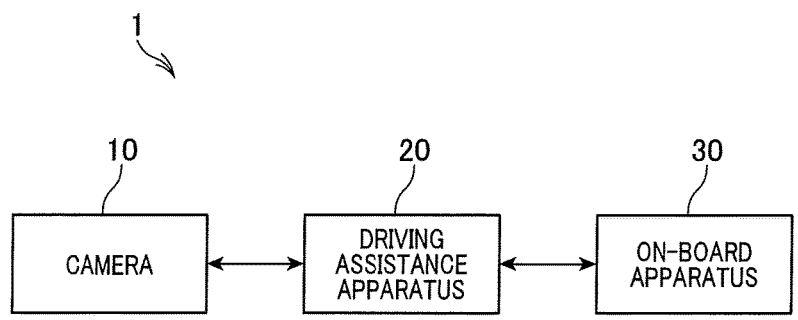
FIG. 1 is a block diagram of a configuration of an on-board system according to an embodiment.

An on-board system 1 is composed of a camera 10, a driving assistance apparatus 20, a single or plurality of on-board apparatuses 30, and the like (see FIG. 1). The camera 10 captures images of the periphery of the own vehicle. The driving assistance apparatus 20 performs driving assistance processing of the own vehicle based on the captured images from the camera 10.

The camera 10 outputs image signals that indicate the captured images of the periphery of the own vehicle to the driving assistance apparatus 20.

The driving assistance apparatus 20 generates captured images of the periphery of the own vehicle based on the image signals from the camera 10, and detects obstacles, such as pedestrians and vehicles, white lines drawn on the road surface, and the like from the captured images. The driving assistance apparatus 20 then controls the on-board apparatus 30 and the like based on the detection results and performs driving assistance process.

Specifically, for example, the driving assistance apparatus 20 may perform a warning process, steering control, speed control, and the like to avoid collision with an obstacle or to prevent deviation from a traffic lane. The driving assistance apparatus 20 may also control the direction, brightness, and the like of the headlights, perform adaptive cruise control, and the like.

Figure 2:
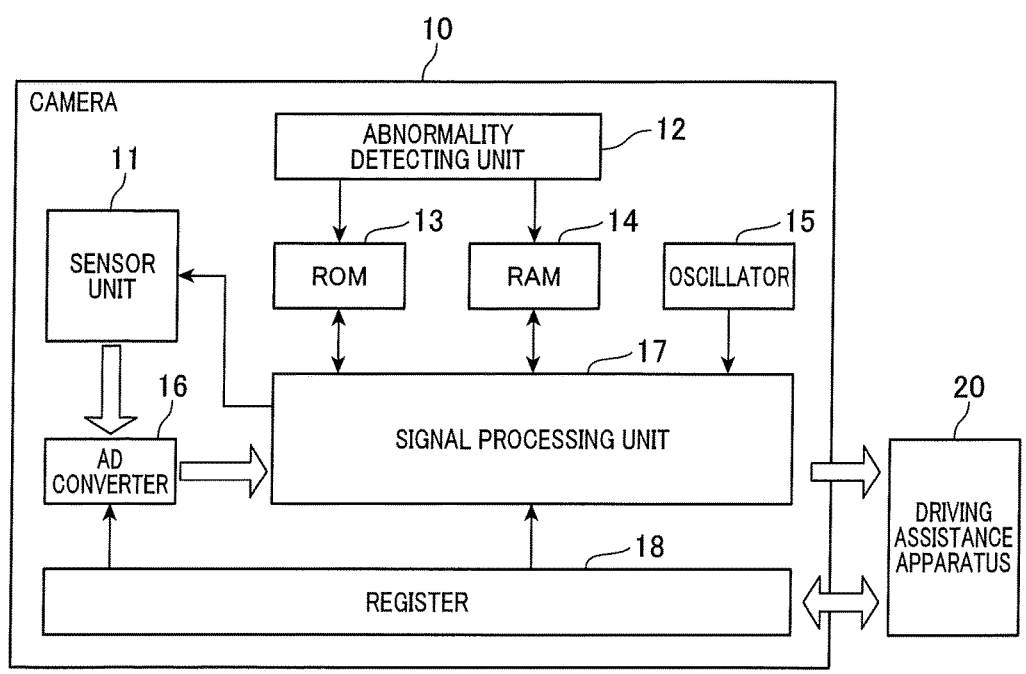
FIG. 2 is a block diagram of a configuration of a camera according to the embodiment.

In addition, the camera 10 includes a sensor unit 11, an abnormality detecting unit 12, a read only memory (ROM) 13, a random access memory (RAM) 14, an oscillator 15, an analog-to-digital (AD) converter 16, a signal processing unit 17, a register 18, and the like (see FIG. 2). The ROM 13 is a non-volatile storage unit. The RAM 14 is a volatile storage unit. The register 18 is used to control the camera 10.

For example, the ROM 13 stores therein setting values such as exposure time, exposure gain, frame rate, and imaging area, setting values used for signal processing (such as a pixel defect correction process and a noise removal process) performed by the signal processing unit 17, inspection data used for inspection of the camera 10, and the like. The ROM 13 may be configured by a rewritable, non-volatile storage unit, such as a flash memory.

The RAM 14 is used for signal processing performed by the signal processing unit 17.

The oscillator 15 generates vertical and horizontal synchronizing signals and a pixel clock (referred to, hereinafter, as timing signals). The vertical synchronizing signal sets the segmentation of a single frame (the total number of pixels in an imaging area). The horizontal synchronizing signal sets the segmentation per horizontal direction within a frame. In addition, the pixel clock sets the timing at which the pixel value of each pixel in the image captured by the sensor unit 11 is acquired.

The sensor unit 11 includes an imaging sensor such as a complementary metal-oxide-semiconductor (CMOS) image sensor composed of a photodiode array, an amplifier circuit, and the like. The sensor 11 controls the exposure time of the image sensor based on the setting values stored in the ROM 13 and the values set in the register 18. The values in the register 18 can be set and referenced by the driving assistance apparatus 20.

When an image is captured by the image sensor, a signal value (analog value) indicating the luminance of each pixel corresponding to an area within the captured image outputted from the image sensor determined by the setting value of the imaging area is amplified by an amplifying unit based on the setting value of exposure gain. Then, at the timing based on the timing signal generated by the oscillator 15, the amplified signal value is outputted to the AD converter 16.

The AD converter 16 converts the signal value inputted from the sensor unit 11 to a pixel value that is a digital value, and outputs the pixel value to the signal processing unit 17.

The signal processing unit 17 performs signal processing on the pixel values successively inputted from the AD converter 16, based on the setting values stored in the ROM 13 and the setting values in the register 18, and performs correction of defective pixels, noise removal, and the like. Then, the signal processing unit 17 transmits image signals indicating the pixel values and the like after signal processing to the driving assistance apparatus 20. Signal processing is performed using the RAM 14. In addition, a configuration is also possible in which the signal processing unit 17 includes a central processing unit (CPU) that operates based on programs stored in the ROM 13 and performs the signal processing.

Furthermore, the abnormality detecting unit 12 detects garbled data that has occurred as a result of noise, for example, in at least one of the ROM 13, the RAM 14, and the register 18 (detects that an error has occurred in the stored data, or in other words, the stored data has changed to an abnormal value).

Figure 3:
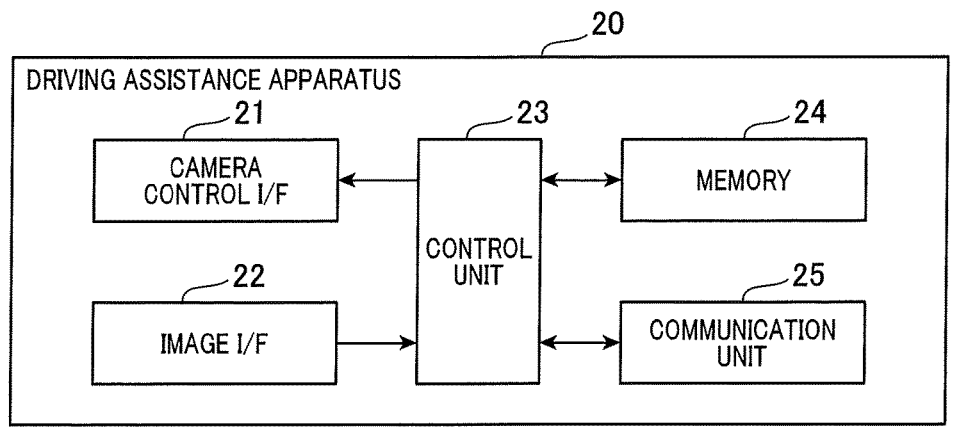
FIG. 3 is a block diagram of a configuration of a driving assistance apparatus according to the embodiment.

Meanwhile, the driving assistance apparatus 20 includes a camera control interface (I/F) 21, an image I/F 22, a control unit 23, a memory 24, and a communication unit 25 (see FIG. 3).

The camera control I/F 21 is a section that performs communication with the camera 10.

The image I/F 22 is a section that receives the input of image signals from the camera 10.

The memory 24 is configured as a volatile storage unit such as a RAM, and stores therein the captured image data generated by the camera 10 and the like.

The control unit 23 is composed of a CPU, a ROM, a RAM, an input/output (I/O), and the like. The control unit 23 reads out and runs programs stored in the ROM or the like, and performs integrated control of the driving assistance apparatus 20. In addition, the control unit 23 stores captured image data based on the image signals inputted via the image I/F 22 in the memory 24, and performs driving assistance processing based on the captured image generated from the captured image data.

In addition, the control unit 23 performs communication with the camera 10 via the camera control I/F 21, and sets and references the values in the register 18.

The communication unit 25 communicates with the one or plurality of on-board apparatuses 30 via an in-vehicle local area network (LAN) (not shown).

[Operations]

Figure 4:
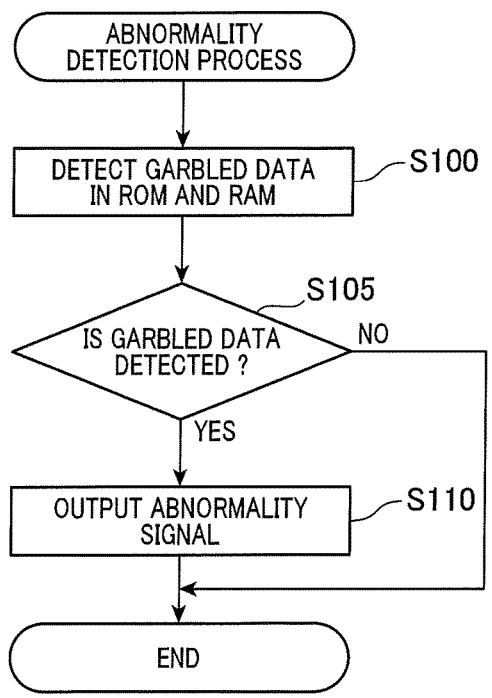
FIG. 4 is a flowchart of an abnormality detection process according to the embodiment.

Next, an abnormality detection process for detecting garbled data in the ROM 13, the RAM 14, or the register 18 of the camera 10 will be described with reference to the flowchart in FIG. 4. The present process is performed at a periodic timing by the abnormality detecting unit 12 of the camera 10.

At step S100, the abnormality detecting unit 12 checks whether or not garbled data has occurred in the ROM 13, the RAM 14, or the register 18 based on a checksum, a Hamming code, or a cyclic redundancy check (CRC).

Specifically, when the checksum is used, for example, the checksum codes of the data stored in the ROM 13 (such as the various types of setting values and inspection data described above) may be calculated and stored at a predetermined address in the ROM 13 in advance. The abnormality detecting unit 12 may then recalculate the checksum codes of the data stored in the ROM 13 and compare the recalculated checksum codes to the checksum codes stored at the predetermined address, thereby detecting garbled data in the ROM 13.

In addition, when the CRC is used, a generating polynomial and a CRC code may be calculated for a bit string composed of the data stored in the ROM 13, and stored at a predetermined address in the ROM 13 in advance. The abnormality detecting unit 12 may then detect garbled data in the ROM 13 based on the bit string composed of the data stored in the ROM 13 and the generating polynomial and the CRC code stored at the predetermined address.

The abnormality detecting unit 12 may similarly calculate the checksum codes or the generating polynomial and the CRC code for the data stored in the RAM 14 or the register 18, each time the data is updated, and store the calculated checksum codes or generating polynomial and CRC code at a predetermined address in the RAM 14 or in a predetermined register. The abnormality detecting unit 12 may then detect garbled data in the RAM 14 or the register 18 based on the stored checksum codes or generating polynomial and CRC code.

In addition, data may be stored in the ROM 13, the RAM 14, or the register 18 in a state in which a Hamming code is attached. The abnormality detecting unit 12 may then detect garbled data of each piece of data stored in the ROM 13, the RAM 14, or the register 18, based on the Hamming code. When correction is possible, the abnormality detecting unit 12 may perform data correction without detecting garbled data.

Moreover, a configuration is also possible in which the data stored in the ROM 13 or the RAM 14 is stored in a plurality of areas. When the data stored in the ROM 13 or the RAM 14 is used or the like, the abnormality detecting unit 12 may then access the plurality of areas in which the data is stored and perform comparison with the read-out data, thereby detecting that garbled data has occurred.

Furthermore, each time the setting values in the register 18 are updated, a backup of the updated setting values may be stored in the RAM 14. At a predetermined timing, the setting values in the register 18 and the setting values that have been backed up may be compared, thereby detecting that garbled data has occurred.

At step S105, the abnormality detecting unit 12 determines whether or not garbled data is detected. When an affirmative determination is made (Yes at step S105), the abnormality detecting unit 12 proceeds to step S110. When a negative determination is made (No at step S105), the abnormality detecting unit 12 ends the present process.

At step S110, the abnormality detecting unit 12 transmits, to the driving assistance apparatus 20, an abnormality signal that indicates that garbled data has occurred in the ROM 13, the RAM 14, or the register 18. The abnormality detecting unit 12 then ends the present process. The abnormality detecting unit 12 may transmit the abnormality signal by changing the level at the output port connected to the camera control I/F 21 of the driving assistance apparatus 20. In addition, the abnormality detecting unit 12 may transmit the abnormality signal via a serial communication path connected to the camera control I/F 21 of the driving assistance apparatus 20.

Figure 5:
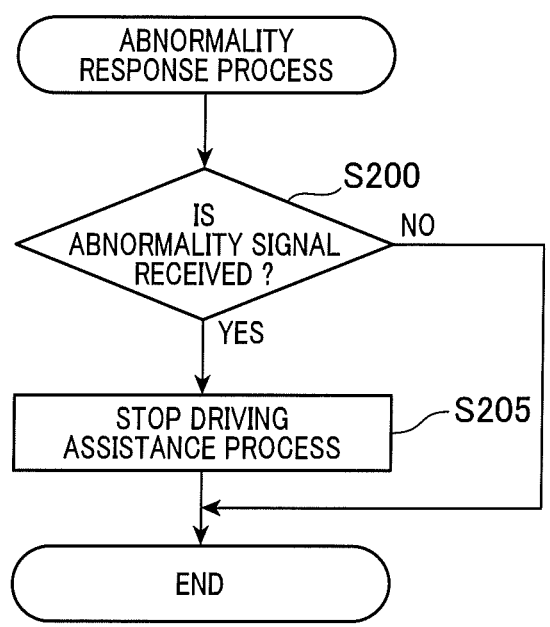
FIG. 5 is a flowchart of an abnormality response process according to the embodiment.

Next, an abnormality response process for handling garbled data in the ROM 13, the RAM 14, or the register 18, performed by the driving assistance apparatus 20, will be described with reference to the flowchart in FIG. 5. The present process is performed at a periodic timing by the control unit 23 of the driving assistance apparatus 20.

At step S200, the control unit 23 determines whether or not an abnormality signal has been received from the camera 10 via the camera control I/F 21. When an affirmative determination is made (Yes at step S200), the control unit 23 proceeds to step S205. When a negative determination is made (No at step S200), the control unit 23 ends the present process.

At step S205, the control unit 23 stops the driving assistance processing performed by the own apparatus and ends the present process. In addition, the control unit 23 may, for example, perform a process to reset the camera 10 via the camera control I/F/21.

(Effects)

When garbled data occurs in the ROM 13, the RAM 14, or the register 18 of the camera 10, for example, image quality (such as color or sensitivity) of the captured image may change, noise may increase, or vertical stripes, lateral stripes, and the like may be formed. Thus, an abnormality may occur in the captured image. The driving assistance apparatus 20 cannot determine whether or not such abnormalities have occurred in the captured image acquired from the camera 10, and may perform inappropriate driving assistance processing based on the captured image in which an abnormality has occurred.

In this regard, according to the present embodiment, garbled data in the ROM 13, the RAM 14, or the register 18 is detected by the abnormality detecting unit 12 provided in the camera 10. Therefore, garbled data can be accurately detected. In addition, in the driving assistance apparatus 20, when an abnormality signal is inputted, driving assistance processing is stopped. Therefore, garbled data in the ROM 13, the RAM 14, or the register 18 in the camera 10 can be appropriately handled.

(Other Embodiments)

(1) The abnormality detecting unit 12 of the camera 10 according to the present embodiment detects garbled data in the ROM 13, the RAM 14, or the register 18. However, the present disclosure is not limited thereto.

For example, the abnormality detecting unit 12 may detect abnormality in another section, such as the oscillator 15 or the AD converter 16. When an abnormality is thereby detected, the abnormality detecting unit 12 may output an abnormality signal to the driving assistance apparatus 20. Then, when such an abnormality signal is received, the driving assistance apparatus 20 may stop driving assistance processing or the like in a manner similar to when garbled data has occurred in the ROM 13 and the like. Even when configuration such as this is provided, an abnormality in the camera 10 can be appropriately handled.

(2) In addition, according to the present embodiment, an example is given in which the present disclosure is applied to the on-board system 1 that performs driving assistance based on captured images of the periphery of the own vehicle. However, the present disclosure can also be applied to, for example, an authentication system that performs personal authentication based on images captured by a camera, and a security system that detects intruders and the like based on images captured by a camera.

(Correspondence with Scope of Claims)

The correspondence between the terms used in the description of the embodiment above and terms used in the scope of claims will be indicated.

The on-board system 1 corresponds to an example of a control system. The driving assistance apparatus 20 corresponds to an example of a control apparatus. The sensor unit 11, the oscillator 15, the AD converter 16, and the signal processing unit 17 correspond to an example of imaging unit. The ROM 13, the RAM 14, and the register 18 correspond to an example of storage means. The abnormality detecting unit 12 corresponds to an example of detecting means.

In addition, the camera control I/F 21 corresponds to an example of receiving means. The image I/F corresponds to an example of an acquiring means. The control unit 23 corresponds to an example of executing means.

Furthermore, S110 of the abnormality detection process corresponds to an example of output means.

Moreover, S205 of the abnormality response process corresponds to an example of abnormality responding means.

What is claimed is:

1. An on-board system comprising:

a camera including an imaging unit, comprising an image sensor, configured to generate the captured image and to perform signal processing with respect to the captured image based on setting values; and a control unit, using a processor, that executes a process based on the captured image acquired by the camera, receives input of an abnormality signal indicating an abnormality in the imaging unit, and performs a process to handle the abnormality in the imaging unit indicated by the abnormality signal;

wherein:

the camera is further configured to detect an abnormality of the setting values used for a pixel defect correction process and a noise removal process performed with respect to pixel values of the captured image, stored in a storage means provided in the camera, and to output the abnormality signal indicating that the abnormality in the setting values has been detected;

the setting values used for the pixel defect correction process and the noise removal process include an exposure time value, an exposure gain value, a frame rate value, and an imaging area value;

the control apparatus is mounted to a vehicle;

the control unit is configured to execute a driving assistance processing for the vehicle and stop the driving assistance processing executed by the control unit upon receiving the input of the abnormality signal; and the control unit stops the driving assistance processing based on the captured image acquired by the camera upon receiving, from the camera, the abnormality signal indicating that the abnormality in the setting values has been detected.

* * * * *